United States Patent [19]
Agrawal et al.

[11] Patent Number: 6,106,674
[45] Date of Patent: Aug. 22, 2000

[54] OPERABLE AND EFFICIENT DISTILLATION SCHEMES FOR MULTICOMPONENT SEPARATIONS

[75] Inventors: Rakesh Agrawal, Emmaus; Zbigniew Tadeusz Fidkowski, Macungie, both of Pa.

[73] Assignee: Air Products and Chemicals, Inc., Allentown, Pa.

[21] Appl. No.: 09/084,722

[22] Filed: May 26, 1998

[51] Int. Cl.[7] ........................................ B01D 3/32
[52] U.S. Cl. .................. 203/75; 203/74; 203/77; 203/78; 203/80; 203/99; 203/DIG. 19; 62/630; 62/631
[58] Field of Search ................... 203/73, 75, 78, 203/80, 71, 74, 99, 77, DIG. 19; 62/630, 631

[56] References Cited

U.S. PATENT DOCUMENTS 5,035,776   7/1991   Knapp et al. .............................. 203/78

OTHER PUBLICATIONS

R. Perry: "Perrys' Chemical Engineers' Handbook" 1985, Mc Graw–Hill, New York (US) pp. 13–5–13–10.
W. Gerhartz: Ullmann's Encyclopedia of Industrial Chemistry, Band B$^3$, 1988 pp. 4–46–450.
Fidkowski, Z. T., "Minimum Energy Requirements of Thermally Coupled Distillation Systems", *AIChE Journal*, pp. 643–653, vol. 33, 1967.
Sargent, R. W. H., "A Functional Approach to Process Synthesis and Its Application to Distillation Systems", *Computers Chem. Eng.*, vol. 22, pp. 31–45, 1998.
Rudd, H., "Thermal Coupling for Energy Efficiency", *Supplement to the Chemical Engineer*, pp. S14–S15, Aug. 27, 1992.
Triantafyllou, C., "The Design and Optimization of Fully Thermally Coupled Distillation Columns", *Trans. IChemE*, pp. 118–132, vol. 70(A), 1992.
Agrawal, R., "Synthesis of Distillation Column Configurations for a Multicomponent Separation", *Ind. Eng. Chem. Res.*, vol. 35, pp. 1059–1071, 1996.
King, C. J., "Separation Processes", McGraw–Hill, 1981, pp. 711.
"Distillation Coloumn Arrangements with Low Energy Consumption", G. Kaibel, IChemE, pp. 43–59.
"Distillation Columns with Vertical Partitions", Chem Engr. Tech., vol. 10, pp. 92–98.
"The Design of Separators in the Context of Overall Processes", Chem. Eng. Res. Des., vol. 66, pp. 195–228.

*Primary Examiner*—Virginia Manoharan
*Attorney, Agent, or Firm*—Willard Jones, II

[57] ABSTRACT

The present invention teaches an efficient and easier to operate distillation system to separate mixtures containing three or more components into streams enriched in one of the components. In this invention, a liquid stream enriched in the least volatile component is withdrawn from the bottom of one distillation column while a vapor stream enriched in the most volatile component is withdrawn from the top of another distillation column. Of these two distillation columns, the pressure of the distillation column with the bottom liquid enriched in the least volatile component is higher; and this higher pressure distillation column transfers at least two vapor streams from different locations to either one or more other distillation columns within the distillation system. For a ternary mixture, both the vapor streams are transferred to the distillation column with the top vapor enriched in the most volatile component. In the preferred mode, at least one of the vapor transfer is part of a two-way communication between the two columns, i.e., in addition to the transfer of the vapor stream, a return liquid stream is implemented between the same locations of the two columns. This invention allows the flow of all vapor streams from a higher pressure column to a lower pressure column and thereby does not suffer with the operating pressure constraints of the prior art efficient processes.

9 Claims, 10 Drawing Sheets

OPERABLE AND EFFICIENT DISTILLATION SCHEMES FOR MULTICOMPONENT SEPARATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to efficient and easy to operate distillation schemes to separate multicomponent mixtures containing three or more components into product streams each enriched in one of the components. Generally, the objective of a process engineer designing a distillation scheme is to make it more efficient by reducing the heat requirement of the distillation columns within the distillation scheme. The distillation schemes known in the literature that require lower heat duty are quite complex and difficult to operate. As a result, many of these schemes lack operating flexibility and are rarely used in industry. Therefore, there is a need for distillation schemes that are easy to operate while having low heat requirements. The present invention is an answer to this long desired need for improving the operating flexibility of multicomponent distillation while maintaining lower heat duties.

Consider the separation of a ternary mixture having components A, B and C (mixture ABC) into three product streams each enriched in one of the components. A is the most volatile component and C is the least volatile component. To separate a ternary mixture ABC into almost pure components it is required that a distillation scheme use two distillation columns. Such distillation schemes are well known in the art. There are such five well known schemes: direct sequence, indirect sequence, side rectifier, side stripper and fully thermally coupled columns (for examples see page 711 of the book entitled Separation Processes by C. J. King, McGraw-Hill, 1981). It is further known that of all the known ternary distillation schemes, the fully thermally coupled column system requires the least amount of heat duty (see "Minimum Energy Requirements of Thermally Coupled Distillation Systems", Z. Fidkowski and L. Królikowski, AIChE Journal, pages 643–653, volume 33, 1987). In spite of this attractive performance, the fully thermally coupled column system has not been widely used in commercial applications. A description of this scheme, along with associated operating problems will now be given.

FIG. 1 shows a fully thermally coupled column (FC) scheme. A feed mixture containing components A, B and C (stream 10) is fed to first distillation column 100. In this distillation column, the feed stream is separated into two streams that are primarily binary mixtures. The liquid from the bottom of this distillation column (stream 22) is primarily a binary mixture composed of components B and C. Similarly, the vapor from the top of this distillation column (stream 32) is primarily a binary mixture composed of components A and B. Both these primarily binary mixture streams 22 and 32 are fed to different locations of a second distillation column 200. A portion of the liquid from the bottom of second distillation column 200 is recovered as C-enriched product stream 90, and another portion of this liquid is boiled in reboiler 222 and returned as vapor stream 92 to provide boilup for second distillation column 200. The vapor from the top of second distillation column 200 is condensed in condenser 212, a portion is recovered as A-enriched product stream 70 while the other portion is returned to provide the needed liquid reflux for this distillation column. A B-enriched product stream 80 is produced from an intermediate location of second distillation column 200. This withdrawal location is somewhere in between the two primarily binary feed streams 22 and 32. The first distillation column 100 neither uses a reboiler nor a condenser. The boilup at the bottom of this column is provided by feeding a vapor stream 27 from the second distillation column 200. It is important to note that the withdrawal location of vapor stream 27 is from the same location of the second distillation column 200 as the feed location of the primarily binary liquid stream 22. This leads to a two-way communication between the two distillation columns. In a two-way communication mode, when a vapor stream is sent from one column to another column, then a return liquid stream is implemented between the same locations of the two columns. Similarly, the liquid reflux stream 37 to the top of the first distillation column 100 forms another two-way communication between the two distillation columns and is withdrawn from second distillation column 200. It is taught in the prior art that two two-way communications are needed to achieve the lowest heat demand for ternary distillation.

While the heat demand for the scheme in FIG. 1 with two two-way communications is lowest, it has rarely been used. The lack of use has often been attributed to fear of control problems (see "Thermal Coupling for Energy Efficiency", H. Rudd, Supplement to the Chemical Engineer, pages S14–S15, Aug. 27, 1992, and "The Design and Optimization of Fully Thermally Coupled Distillation Columns", C. Triantafyllou and R. Smith, Trans. IChemE, pages 118–132, Volume 70(A), 1992). One of the often cited concern is the flexibility to control the flows over a wide range both at the top and bottom ends of first distillation column 100. For the vapor AB in stream 32 to flow from first distillation column 100 to second distillation column 200 it is required that the pressure at the top of the first column be greater than the pressure at the feed point of stream 32 in second distillation column 200. At the same time, for the vapor BC in stream 27 to flow from second distillation column 200 to first distillation column 100 it is necessary that the pressure at the bottom of first distillation column 100 be lower than the pressure at the originating point of stream 27 in the second column. This leads to an unique restriction that the pressure at the bottom of the first distillation column 100 be lower than the pressure at a point in the bottom section of the second distillation column 200, and at the same time, the pressure at the top of the first distillation column must be higher than the pressure at a point in the top section of the second distillation column. This requires careful adjustment of pressure in both the columns and presents operating concerns for plants requiring wide range of variation in flow rate and other operating parameters. Clearly, there is a need for alternative column arrangements with higher operating flexibility while maintaining lower heat demand for distillation.

It is worth noting that both the liquid transfer streams 37 and 22 at the top and bottom of first distillation column 100 flow in a direction opposite to the vapor flow at each end. This requires that either a pump be used on each of the liquid streams or relative height of the two columns be adjusted to allow each of the liquid stream to be transferred through gravity.

Recently, Agrawal and Fidkowski introduced the scheme shown in FIG. 2 (see U.S. Ser. No. 09/057,211 filed on Apr.

8, 1998, now U.S. Pat. No. 5,970,472). In this figure, the bottom end of first distillation column 100 has a two-way communication with the bottom section of second distillation column 200 and the top end of first distillation column 100 has only one-way communication with the top section of second distillation column 200. Thus, liquid stream 22 from the bottom end of first distillation column 100 is sent to the bottom section of second distillation column 200. A vapor stream 27 is withdrawn from the second distillation column 200 and sent to the bottom of first distillation column 100. A portion of the vapor stream exiting from the top end of first distillation column 100 is sent as stream 32 to second distillation column 200. Unlike FIG. 1, there is no liquid return stream to the top of the first distillation column from the second distillation column. Instead, a portion of the vapor stream from the top of the first distillation column 100 (stream 34) is condensed in condenser 115 and returned as liquid reflux in line 36. Once again, a vapor stream is transferred from the first distillation column to the second distillation column and a second vapor stream is transferred in the reverse direction. This leads to the same operating challenges as described for the scheme in FIG. 1.

The same challenge exists when mixtures containing more than three components are distilled to produce product streams each enriched in one of the components. The reason being that the distillation schemes with low heat demand used to distill mixtures with more than three components are made up of the ternary subschemes shown in FIGS. 1 and/or 2. Therefore deficiencies of the ternary subschemes are also carried to the distillation of mixtures containing a greater number of components. Some known examples are four and five component distillation schemes can be found in a paper by Agrawal ("Synthesis of Distillation Column Configurations for a Multicomponent Separation", Ind. Eng. Chem. Res., volume 35, pages 1059–1071, 1996) and a paper by Sargent ("A Functional Approach to Process Synthesis and its Application to Distillation Systems", Computers Chem. Eng., volume 22, pages 31–45, 1998).

A sequential four-component separation scheme with at least four two-way communications is shown in FIG. 3. The feed mixture ABCD is distilled into four product streams. In this mixture, the relative volatility follows the alphabetical order, i.e., A is the most volatile, D is the least volatile and B is more volatile than C. The first column has two two-way communications with the second column which in turn has at least two (generally three) more two-way communications with the final column. Clearly, the challenges associated with the vapor transfers between the columns are now much greater as the pressure profiles in all the three column must be carefully controlled.

A four-component separation scheme with satellite column arrangement is shown in FIG. 4. The feed mixture ABCD is fed to the main column. There are two satellite columns each with two two-way communications with the main column. There is shown a possibility of having a liquid and vapor flow between the two satellite columns. The product stream enriched in the most volatile component A is produced from the top of the main column and the product stream enriched in the heaviest component D is produced from the bottom of this column. Product streams enriched in components of intermediate volatility are produced from each of the satellite columns. For each satellite column, in order to transfer vapor streams between columns, the pressure at the bottom must be lower than the pressure at a point in the bottom section of the main column and simultaneously, the pressures at the top of the satellite columns must be greater than the pressure in the top corresponding section of the main column. Furthermore, pressures of each of the satellite columns has to be adjusted to allow the flow of vapor and liquid streams enriched in component B and C in proper direction between the two satellite columns. All this presents a great deal of difficulty in the operation of such integrated schemes with multiple two-way communications between the distillation columns.

BRIEF SUMMARY OF THE INVENTION

The present invention relates to a process for the separation of a feed stream containing three or more major constituent components of different relative volatilities into product streams that are enriched in one of the major constituent component by distillation in a distillation column system containing at least two distillation columns comprising:

(a) feeding the feed stream containing three or more major constituent components to a distillation column of the distillation column system;

(b) producing a vapor stream enriched in the most volatile major constituent component at the top of one of the distillation columns in the distillation column system and providing reflux to the distillation column producing the vapor stream enriched in the most volatile major constituent component by feeding a liquid stream enriched in the most volatile major constituent component to the top of such column;

(c) producing a liquid stream enriched in the least volatile major constituent component at the bottom of a distillation column that is different from the distillation column used in step (b) and providing vapor boilup to the distillation column that is different from the distillation column used in step (b) by feeding a vapor stream enriched in the least volatile major constituent component to the bottom of such column;

(d) operating the distillation column of step (c) such that the operating pressure at the location of this distillation column where a vapor stream is removed to be fed to another distillation column is greater than the operating pressure at the location of the other distillation column where the vapor stream is fed;

(e) feeding a first vapor stream removed from a first location of the distillation column of step (c) to another distillation column of the distillation system;

(f) feeding a second vapor stream removed from a second intermediate location of the distillation column of step (c) to another distillation column within the distillation system;

(g) feeding a vapor stream removed from another distillation column of the distillation column system to the distillation column of step (b).

In the process of the present invention, a portion of the most volatile major constituent component enriched vapor produced from the top of the distillation column of step (b) is at least partially condensed and at least a portion of the condensed stream is fed as the liquid stream reflux to the distillation column of step (b) and/or a portion of the least volatile major constituent component enriched liquid exiting from the bottom of the distillation column of step (c) is at least partially vaporized and at least a portion of the vaporized stream is fed as the vapor boilup stream to the distillation column of step (c).

In one embodiment of the process of the present invention, at least one of the vapor streams that are transferred in steps (e) and (f) is part of a two-way communication, wherein a liquid stream is also removed from a location of the distillation column where vapor is fed and this removed liquid stream is fed to a location of the distillation column from where the vapor stream was removed.

In another embodiment of the process of the present invention, the first and second vapor streams that are transferred in steps (e) and (f) are part of a two-way communication, wherein a liquid stream is also removed from a location of the distillation column where vapor is fed and this removed liquid stream is fed to a location of the distillation column from where the vapor stream was removed.

There are three (3) preferred embodiments of the process of the present invention for a ternary mixture.

In the first embodiment for a feed stream with three (3) components and a two (2) column distillation column system, the feed stream contains three major constituent components of different relative volatilities; the distillation column system is comprised of a first distillation column and a second distillation column; the feed stream is fed to the first distillation column; the distillation column of step (b) is the second distillation column; the distillation column of step (c) is the first distillation column; the first vapor stream of step (e) is removed from the top of the first distillation column and fed to and intermediate location of the second distillation column; a portion of said first vapor stream is condensed and returned as reflux to the top of the first distillation column; the second vapor stream of step (f) is removed from the first distillation column at a location intermediate of the feed stream to and the bottom of the first distillation column and fed to the bottom of the second distillation column; liquid from the bottom of the second distillation column is fed to the first distillation column at the withdrawal location of said second vapor stream thereby establishing a two-way communication between the first and second distillation columns; a product stream enriched in the major constituent component of intermediate volatility is removed and recovered from an intermediate location of the second distillation column; a product stream enriched in the least volatile major constituent component is removed and recovered from the bottom of the first distillation column; and a product stream enriched in the most volatile major constituent component is removed and recovered from the top of the second distillation column.

In the second embodiment, the feed stream is fed to the first distillation column; the distillation column of step (b) is the second distillation column; the distillation column of step (c) is the first distillation column; the first vapor stream of step (e) is removed from the top of the first distillation column and fed to an intermediate location of the second distillation column; liquid from the same intermediate location of the second distillation column is fed to the top of the first distillation column as reflux thereby establishing a two-way communication between the first and second distillation columns; the second vapor stream of step (f) is removed from the first distillation column at a location intermediate of the feed stream to and the bottom of the first distillation column and fed to the bottom of the second distillation column; and liquid from the bottom on the second distillation column is fed to the first distillation column at the withdrawal location of said second vapor stream thereby establishing a two-way communication between the first and second distillation columns; a product stream enriched in the major constituent component of intermediate volatility is removed and recovered from an intermediate location of the second distillation column; a product stream enriched in the least volatile major constituent component is removed and recovered from the bottom of the first distillation column; and a product stream enriched in the most volatile major constituent component is removed and recovered from the top of the second distillation column.

In the third embodiment, the feed stream is fed to the first distillation column; the distillation column of step (b) is the first distillation column; the distillation column of step (c) is the second distillation column; the first vapor stream of step (e) is removed from the top of the second distillation column and fed to an intermediate location of the first distillation column; liquid from the same intermediate location of the first distillation column is fed to the top of the second distillation column as reflux thereby establishing a two-way communication between the first and second distillation columns; the second vapor stream of step (f) is removed from the second distillation column at an intermediate location and fed to the bottom of the first distillation column; and liquid from the bottom on the first distillation column is fed to the second distillation column at the withdrawal location of said second vapor stream thereby establishing a two-way communication between the first and second distillation columns; a product stream enriched in the major constituent component of intermediate volatility is removed and recovered from an intermediate location of the second distillation column; a product stream enriched in the least volatile major constituent component is removed and recovered from the bottom of the second distillation column; and a product stream enriched in the most volatile major constituent component is removed and recovered from the top of the first distillation column.

DETAILED DESCRIPTION OF THE INVENTION

Further to the Summary of the invention, the process of the present invention will now be described in detail with reference to the embodiments shown in FIGS. 5–10.

Figure 5:
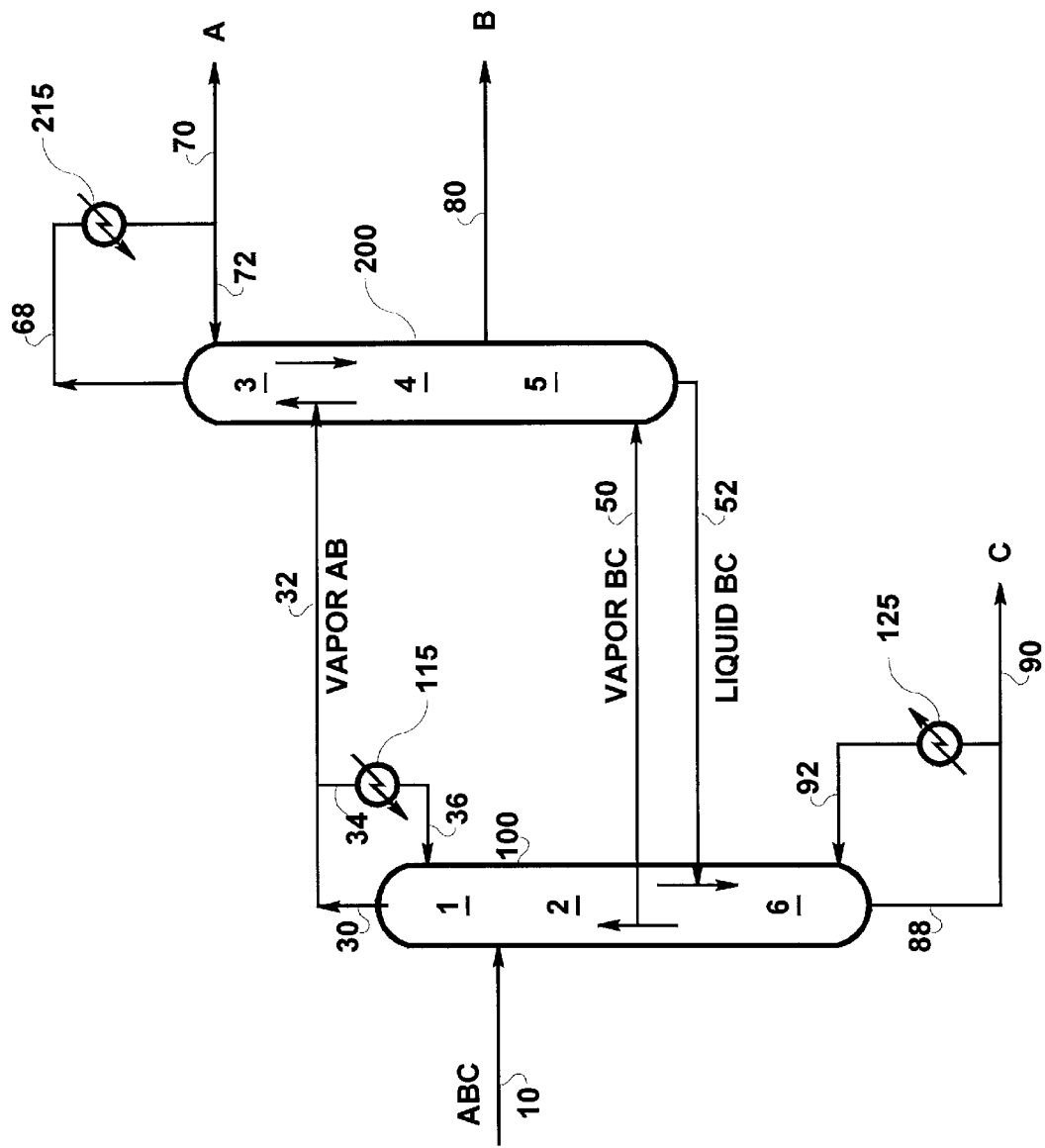
FIGS. 5 through 10 are schematic diagrams of several embodiments of the process of the present invention.
Figure 6:
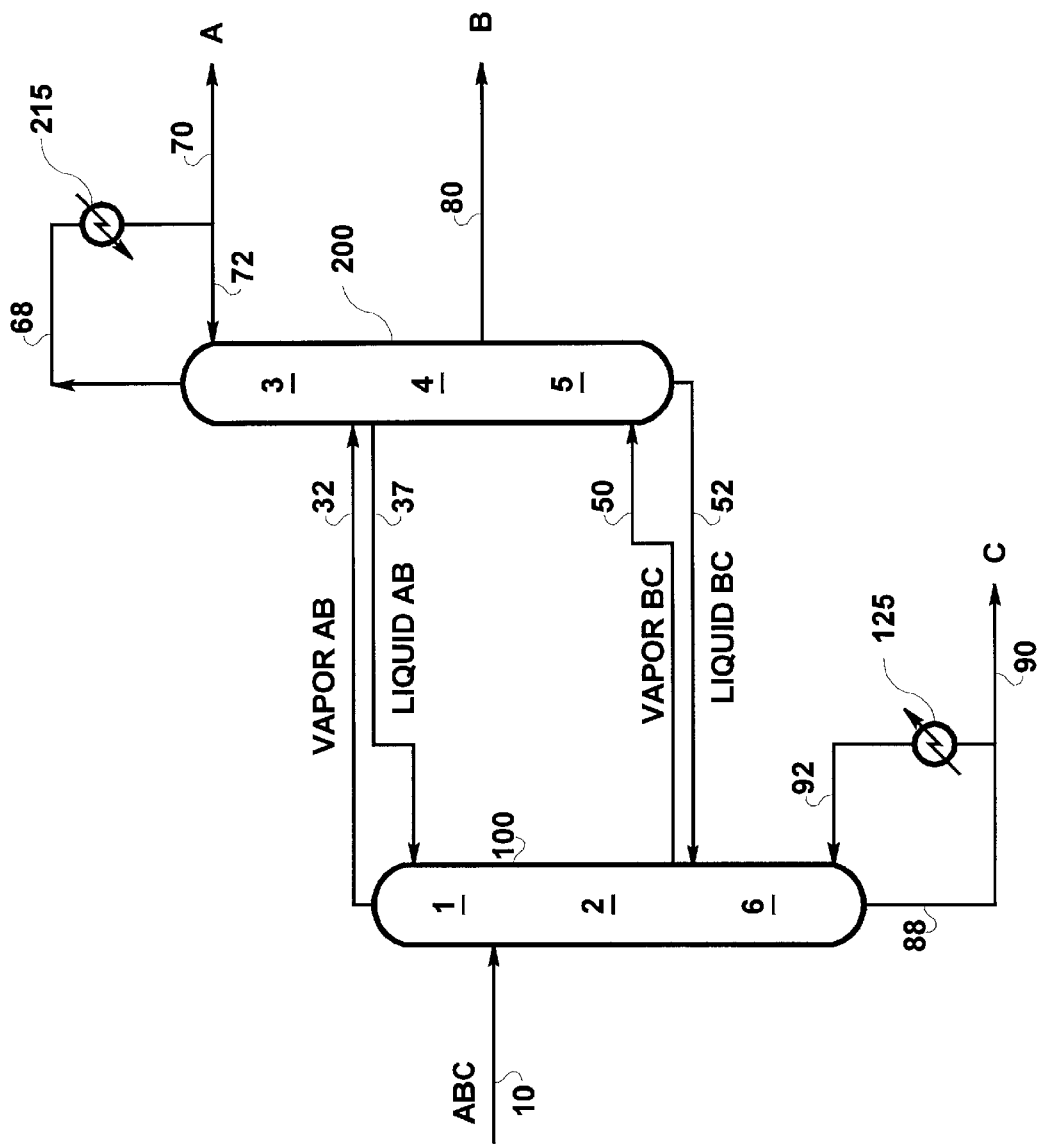
Figure 7:
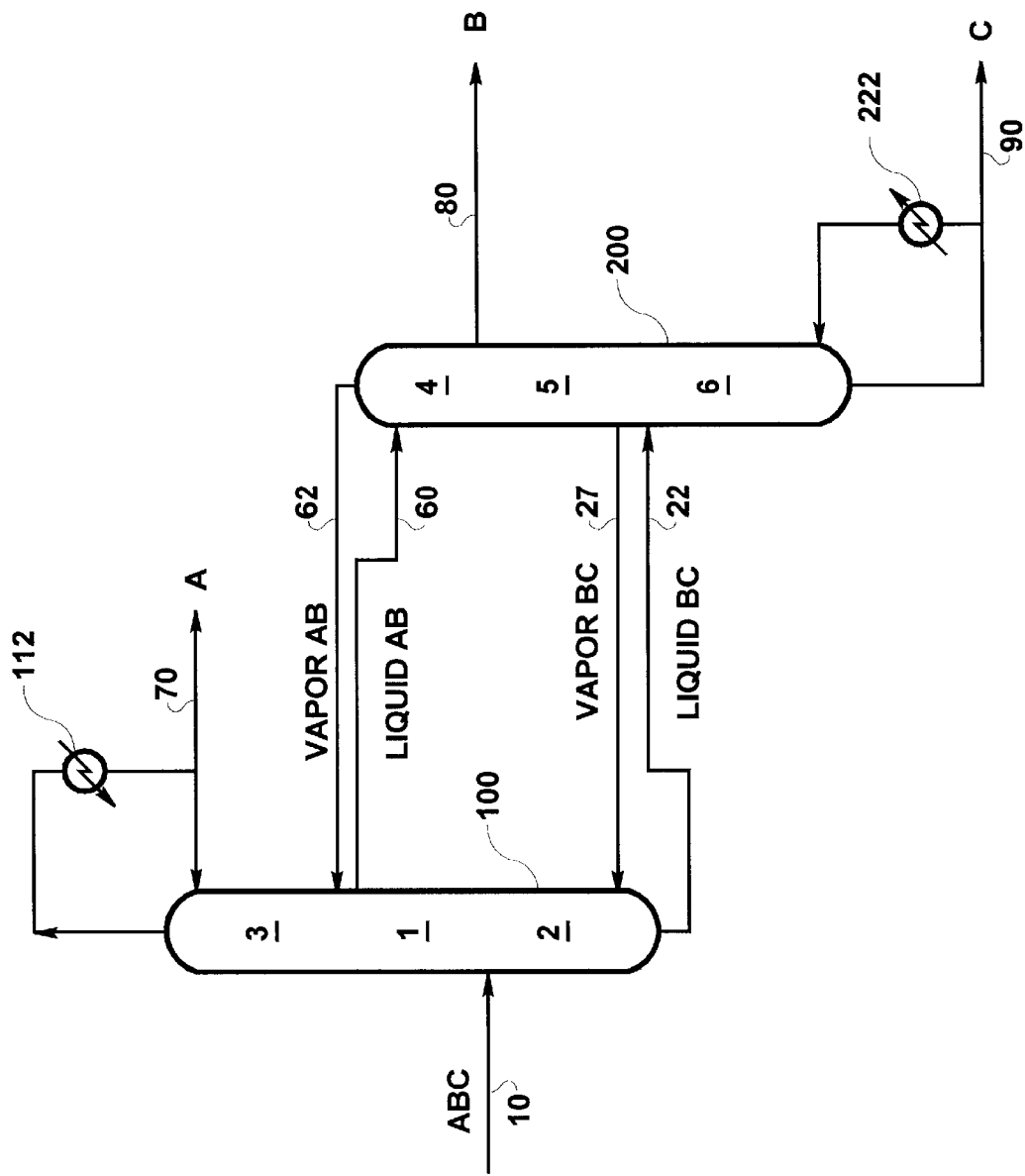

Consider the separation of a ternary mixture containing three major constituent components A, B and C. Sometimes, besides these three major constituent components, other components may also be present in small amounts in the feed mixture. Of the three major constituent components, A is the most volatile and C is the least volatile. The objective is to separate the ternary feed mixture into three product streams each enriched in one of the three major constituent components. FIGS. 5–7 show three embodiments of the present invention for the separation of such a ternary feed mixture.

The distillation system shown in FIG. 5 consists of two distillation columns. Feed mixture 10 is introduced to a first distillation column 100. From the top of the first distillation column 100, a vapor stream 30 that is primarily enriched in major constituent components A and B is produced. This stream 30 could also contain small amounts of C. A portion of this vapor stream is at least partially condensed in condenser 115 and returned as liquid reflux (stream 36) to first distillation column. The other portion of the vapor stream 30 is fed as stream 32 to an intermediate location in the top section of second distillation column 200. From the bottom of the first distillation 100, a liquid stream 88 enriched in the least volatile major constituent component C is produced. A portion of this stream is recovered as product stream 90. Another portion of stream 88 is at least partially vaporized in reboiler 125 and returned to the distillation column as vaporized stream 92. In this figure, first distillation column 100 is the distillation column with the least volatile major constituent component at bottom as described in step (c) of the invention. Transfer of vapor stream 32 from the top of the first distillation column 100 to the second distillation column 200 is according to step (e) of the invention. According to step (f) of the invention, a vapor stream 50 that is primarily enriched in components B and C is withdrawn from an intermediate location of the first distillation column 100 and fed to the bottom of the second distillation column 200. According to the preferred embodiment of invention, a liquid stream 52 is fed from the bottom of the second distillation column 200 to the withdrawal location of stream 50 in the first distillation column 100. This establishes a two-way communication between the two columns. The two vapor feeds to the second distillation column 200 are distilled to produce a vapor stream 68 enriched in the most volatile major constituent component A from the top. This vapor stream is condensed in condenser 215 and a portion is returned as liquid reflux stream 72 to the distillation column and the other portion (stream 70) is recovered as A-enriched product stream. According to step (b) of the invention, the second distillation column 200 is the distillation column with the most volatile major constituent component at top. Furthermore, according to step (d) of the invention, pressure of the first distillation column 100 is higher than the pressure of the second distillation column 200, and, therefore, it is easy to transfer both the vapor streams 32 and 50 from the first distillation column to the second distillation column. Clearly, since the second distillation column 200 receives two vapor streams, step (g) of the invention is easily satisfied.

It should be understood that when a statement is made that the pressure of the first distillation column 100 is greater than the pressure of the second distillation column 200, that such statement means that, for the transfer of any vapor stream between the two columns, the pressure at the withdrawal location of this vapor stream from the first distillation column 100 is greater than the pressure at the location of the second distillation column 200 where the vapor stream is fed. This statement should not necessarily be construed to mean that all of first distillation column 100 has to be at a greater pressure than all of the second distillation column 200. In fact, one skilled in the art can envision the possibility that a location of the first distillation column can actually have a lower pressure than a location of the second distillation column 200. For example using FIG. 5, it is possible for the pressure at the top of the first distillation column 100 to be the same as or lower than the pressure at the bottom of the second distillation column 200, while, the pressure at the top of the first distillation column 100 be greater than the pressure of the feed point of vapor stream 32 to the second distillation column 200. The possibility of this situation is a function of the pressure drop per unit height of the mass transfer contacting devices and the height of the mass transfer contacting devices in the columns.

Figure 2:
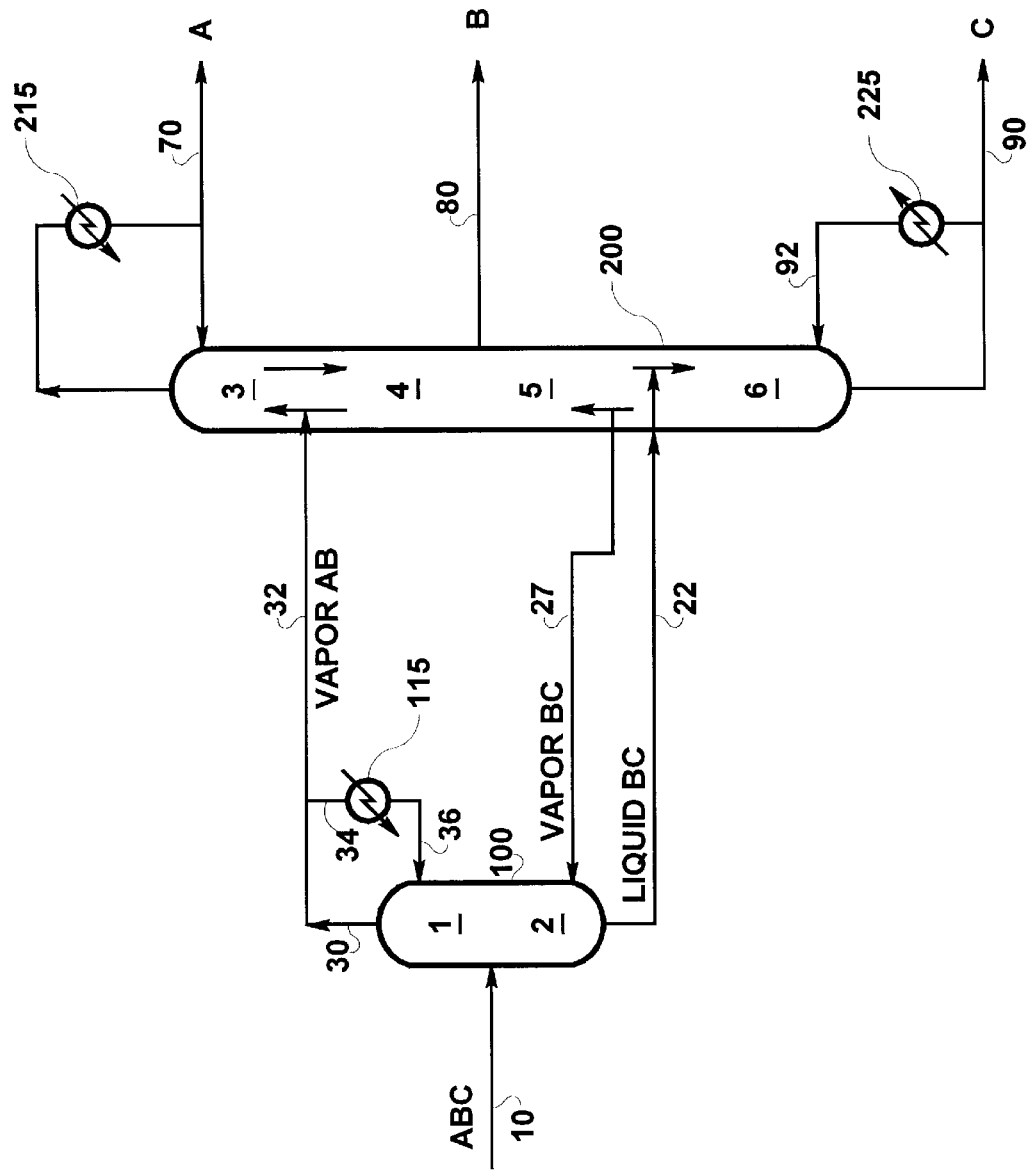

The heat demand to run the distillation system in FIG. 5 is identical to the one for the prior art process in FIG. 2. The current invention has essentially moved distillation section 6 from the second distillation column 200 of FIG. 2 to the first distillation column below section 2 in FIG. 5. All the vapor stream from the top of section 6 is still divided between distillation sections 2 in the first distillation column and 5 in the second distillation column. Similarly, liquid streams from distillation sections 2 and 5 are combined and sent to the top of distillation section 6. Thus, from thermodynamic perspective, both the distillation schemes in FIGS. 2 and 5 will perform identically. However, the distillation scheme in FIG. 5 is superior because it allows an easy flow of vapor streams from one distillation column to another distillation column.

FIG. 6 shows another embodiment of the present invention. The only difference between the processes of FIG. 5 and 6 is that now condenser 115 is not used and all the vapor from the top of the first distillation column 100 is sent as stream 32 to second distillation column 200. The liquid reflux to the top of the first distillation column 100 is now provided by feeding liquid stream 37 that is withdrawn from the feed location of vapor stream 32 to the second distillation column. This example of the present invention shows a two-way communication at both the places where a vapor stream is transferred from one column to another.

Figure 1:
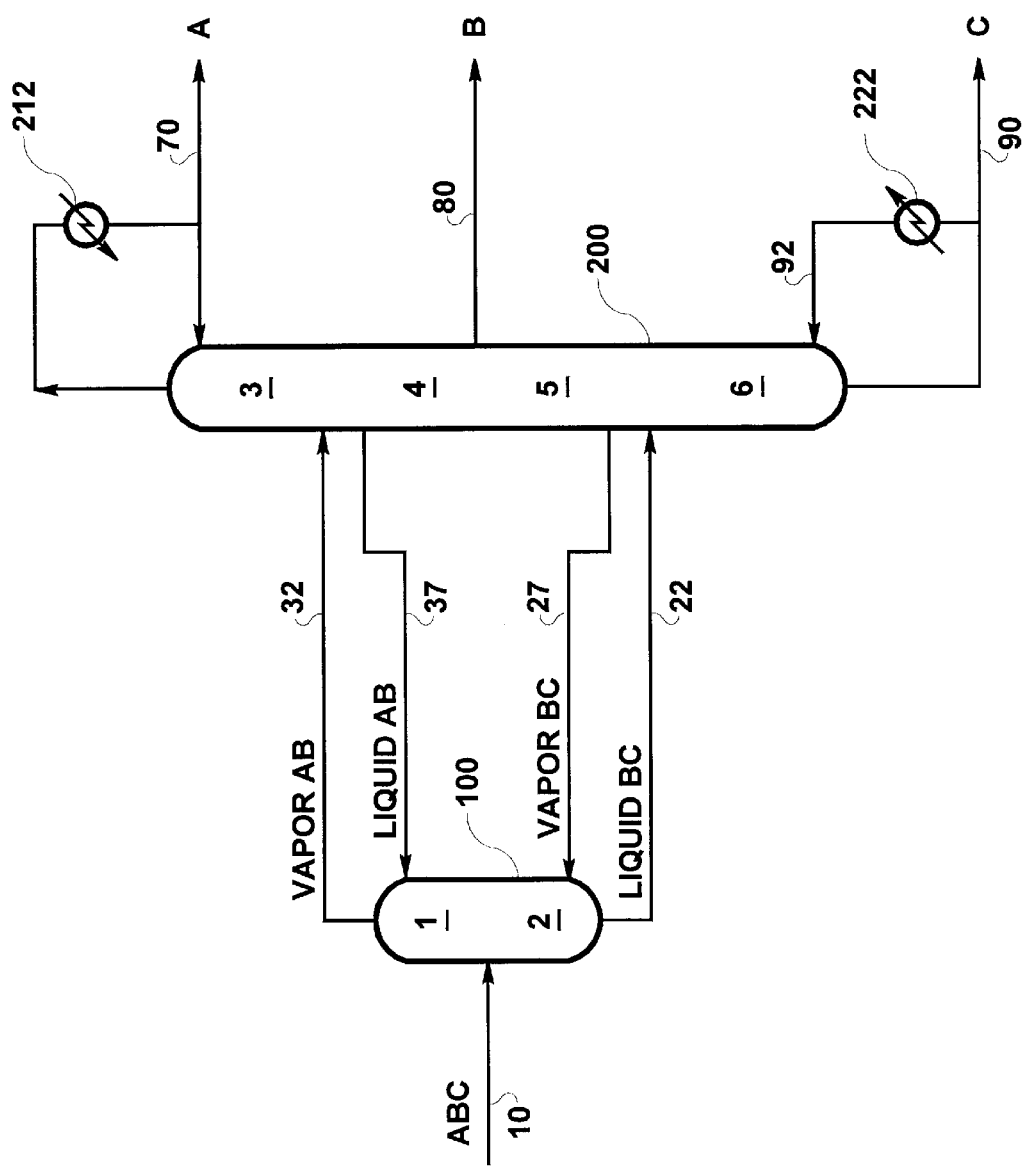
FIGS. 1 through 4 are schematic diagrams of background art processes for the separation of multicomponent mixtures into constituent component products.

The thermodynamic performance of the process of FIG. 6 is identical to the well known fully-coupled process of FIG. 1. The comparison between these two figures is similar to the one described for FIGS. 2 and 5. In other words, the current invention moves distillation section 6 from the bottom of the second distillation column 200 in FIG. 1 to the bottom of the first distillation column 100 in FIG. 6. This eliminates the pressure drop constraints for two vapor stream flows imposed by the prior art process in FIG. 1.

Another embodiment of the present invention that has a thermodynamic performance identical to the well known fully-coupled process in FIG. 1 is shown in FIG. 7. Basically, the current invention moves distillation section 3 from the top of the second distillation column 200 in FIG. 1 to the top of the first distillation column 100 to result in the process of FIG. 7. The two-way communication between the bottom of the first distillation column 100 and an intermediate location between distillation sections 5 and 6 in the second distillation column 200 is same as the one shown for the process in FIG. 1. Now, A-enriched product stream 70 is not produced from the top of the second distillation column but from the top of the first distillation column. Instead, the vapor stream 62 from the top of the second distillation column is sent to the first distillation column. In this figure, a liquid stream 60 is returned from the first distillation column to the second distillation column establishing a second two-way communication. For the process in FIG. 7, the first distillation column 100 is the distillation column with the most volatile major constituent component at top in step (b) of the invention, and the second distillation column 200 is the distillation column with the least volatile major constituent component at bottom in step (c) of the invention. Thus according to step (d) of the invention, pressure of the second distillation column is now higher than the first distillation column 100. Vapor stream 62 is transferred according to step (e) and vapor stream 27 is transferred according to step (f) of the invention. According to the preferred mode, two-way communication is used at each of the vapor transfer locations.

With respect to a ternary feed mixture, there are two thermodynamically equivalent embodiments of the present invention in FIGS. 6 and 7 that can be used in lieu of the fully-coupled scheme in FIG. 1.

Figure 3:
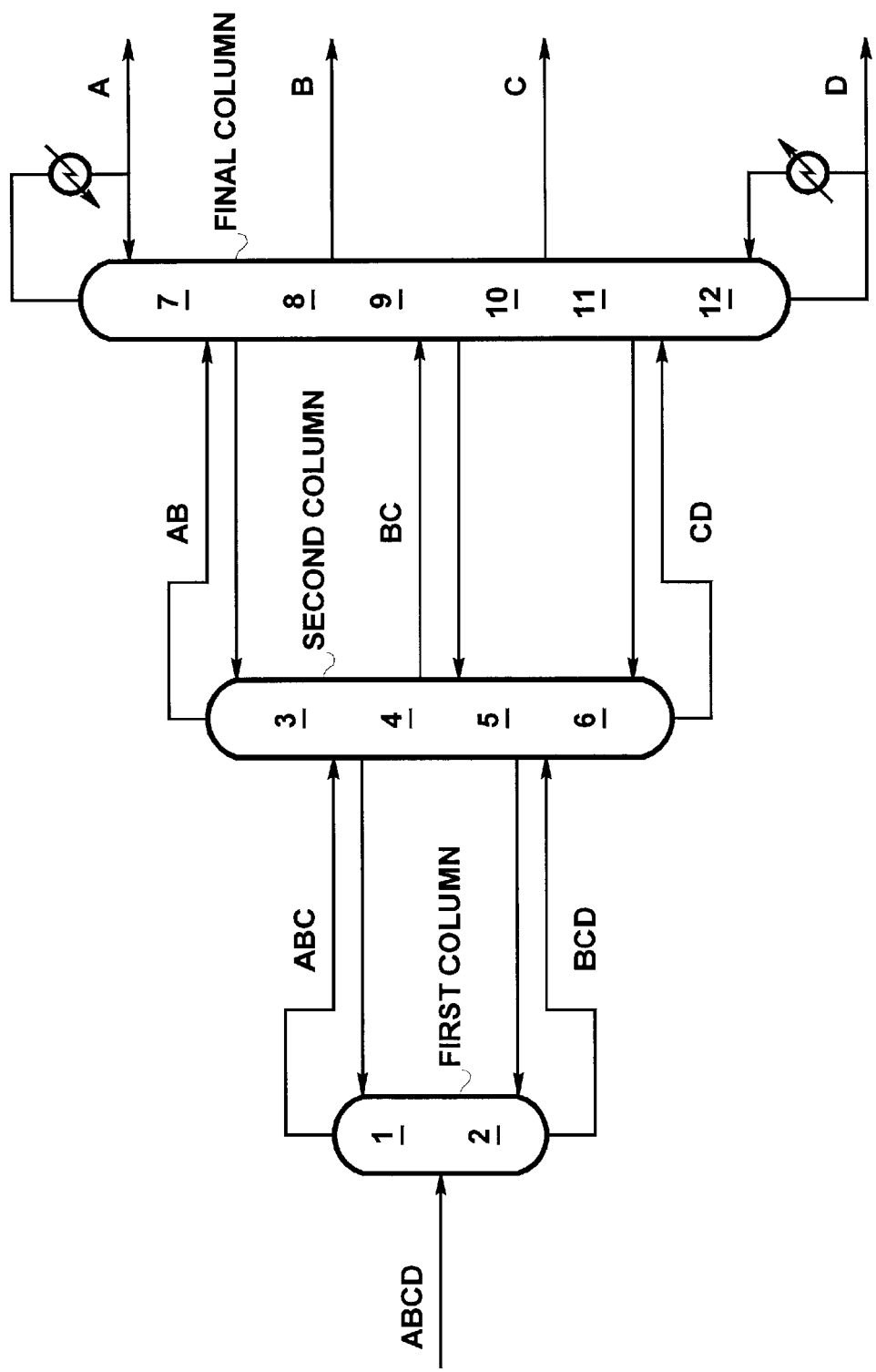
Figure 8:
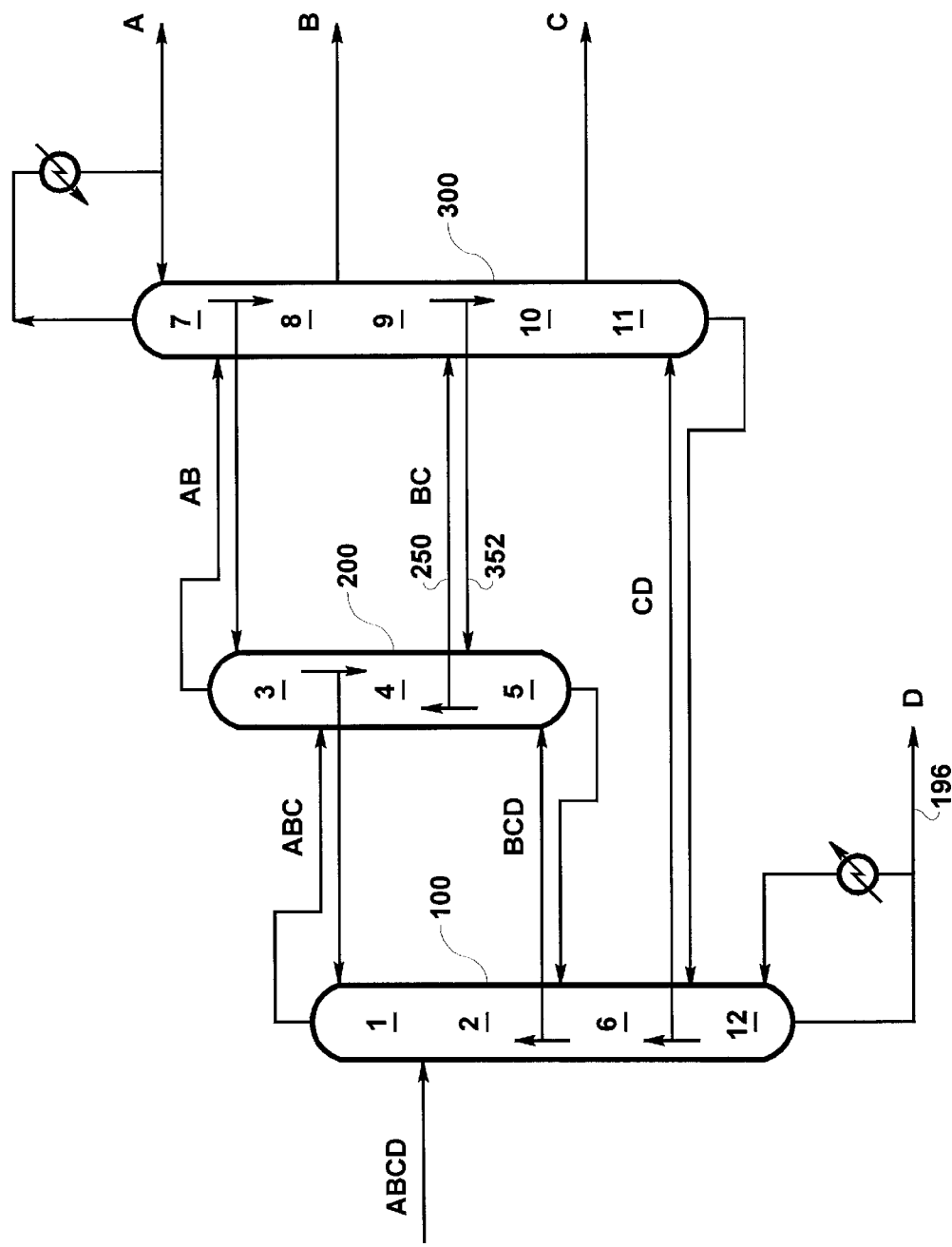

Now, consider the separation of a four-component feed mixture consisting of components A, B, C, and D. An embodiment of the process of the present invention that is thermodynamically equivalent to the process of FIG. 3 is shown in FIG. 8. All the distillation sections are numbered to show equivalent separation zones between the two figures. Distillation sections 6 and 12 are now bottom sections of the first distillation column 100. The heaviest component enriched product stream 196 is now produced from the bottom of the first distillation column 100. The first distillation column 100 is now the distillation column with the least volatile major constituent component at bottom as in step (c) of the invention and the final distillation column 300 is the distillation column with the most volatile major constituent component at top as in step (b) of the invention. According to step (d) of the invention, the pressure of the first distillation column 100 is higher than the pressure of the final distillation column 300. For vapor flows to naturally flow from a higher pressure to a lower pressure, the pressure of the second distillation column 200 is intermediate of the pressures of the first and final distillation columns. Generally, in these multicomponent schemes of the current invention, the operating pressure of the distillation column with the least volatile major constituent component at bottom will be highest of all the distillation columns within the distillation system and the operating pressure of the distillation column with the most volatile major constituent component at top would be lowest. In FIG. 8, since only one reboiler and one condenser are used, all the communications between any two columns are two-way communications. A vapor stream is transferred according to step (e) of the invention from the top of the first distillation column 100 to an intermediate location of the second distillation column 200. There are two more vapor streams that are transferred from the first distillation column 100 according to step (f) of the invention. The second distillation column 200 also transfers two vapor streams to the final distillation column 300. To help in the understanding of this figure, steams are labeled according to the constituent components that are primarily present in the stream. It does not always imply the total absence of other constituent components in that stream. Thus a stream labeled ABC has much lower concentrations of constituent component D. It is clear that as compared to the prior art process of FIG. 3, the process according to current invention in FIG. 8 does not have same operating challenges of transferring the vapor streams from one distillation column to another distillation column.

In the process of FIG. 8, the vapor stream 250 that is primarily composed of constituent components B and C is transferred from the second distillation column 200 to the final distillation column 300. In other words, the vapor from the top of the distillation section 5 is divided into two streams, and one is fed to the bottom of the distillation section 4 and the other (stream 250) is sent to the bottom of distillation section 9 in the final distillation column 300. This leads to higher vapor flow in distillation section 9 than in distillation section 10 and a lower vapor flow in distillation section 4 then in distillation section 5.

Figure 9:
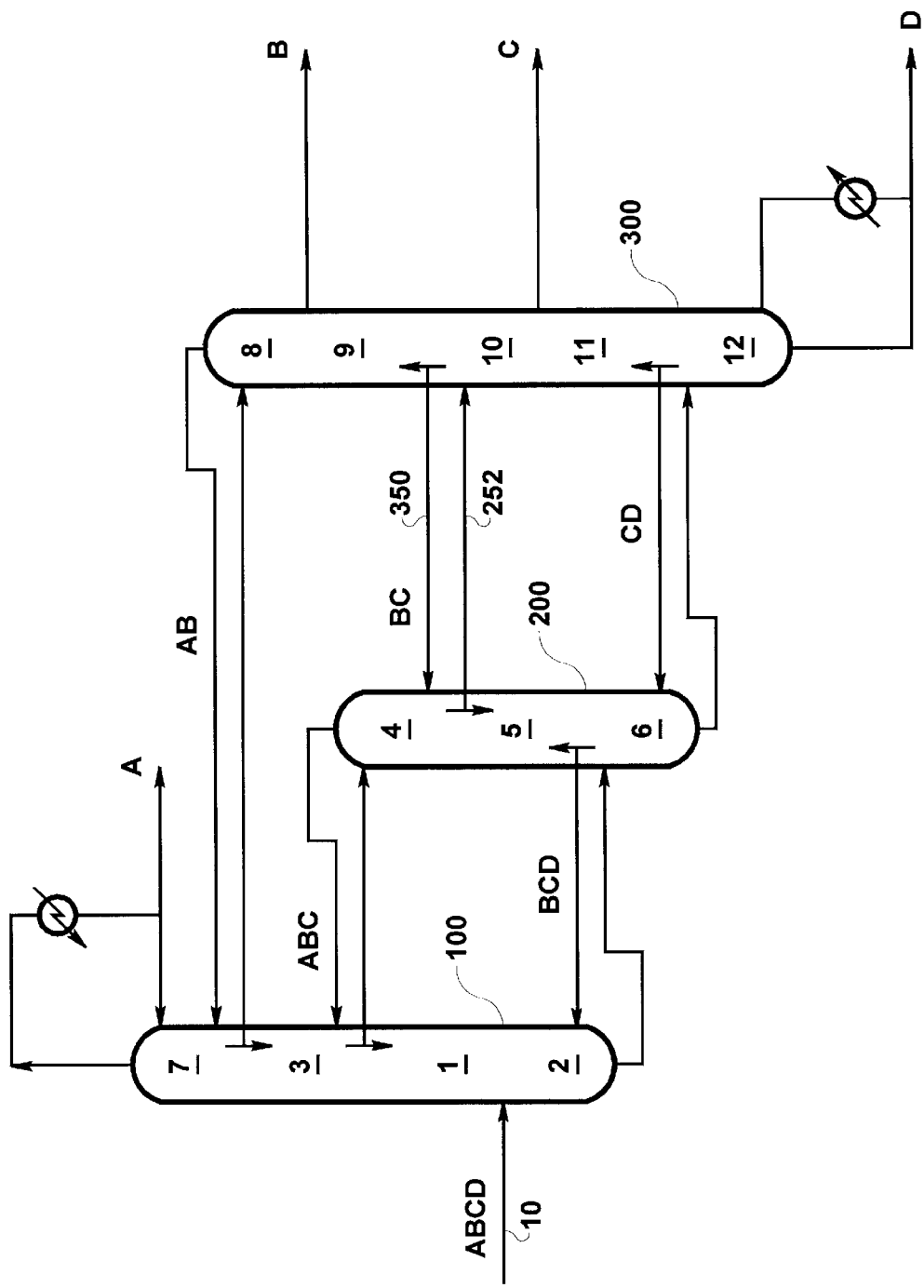

In some applications it may be more desirable to have this vapor flow in reverse direction than the one shown in FIG. 8. This embodiment of the present invention is shown in FIG. 9. Once again, FIGS. 3, 8 and 9 are thermodynamically identical. In FIG. 9, the first distillation column 100 is the distillation column with the most volatile major constituent component at the top and final distillation column 300 is the distillation column with the least volatile major constituent component at the bottom. As a result, the pressure of the final distillation column 300 is higher than the pressure of the first distillation column 100, and the pressure of the second distillation column 200 is intermediate of the pressures of these two distillation columns. Therefore, the vapor stream 350 now flows from the final distillation column 300 to the second distillation column 200. This leads to lower vapor traffic in distillation section 9 than in distillation section 10 and a higher vapor flow in distillation section 4 than in distillation section 5. The liquid stream 252 is shown to flow in a direction opposite to that of the vapor stream 350. It is possible to have the flow of liquid stream 252 in either direction. In another option, only one of the two streams 350 and 252 may be used.

For a four-component feed mixture, the process in FIG. 3 shows a fully thermally coupled distillation scheme that uses only one reboiler and one condenser. The embodiments in FIGS. 8 and 9 are two examples of process of the present invention that are thermodynamically identical to the prior art process of FIG. 3. It is worth pointing out that there are four more such schemes that can be easily drawn according to the current invention when the possibility of using either the condenser or the reboiler with the second distillation column 200 is considered Thus, there are a total of six possible distillation schemes that are thermodynamically identical to the process of FIG. 3 and each one does not have the vapor flow challenges faced by the prior art process. The choice of a particular scheme will depend on the separation task at hand.

Figure 4:
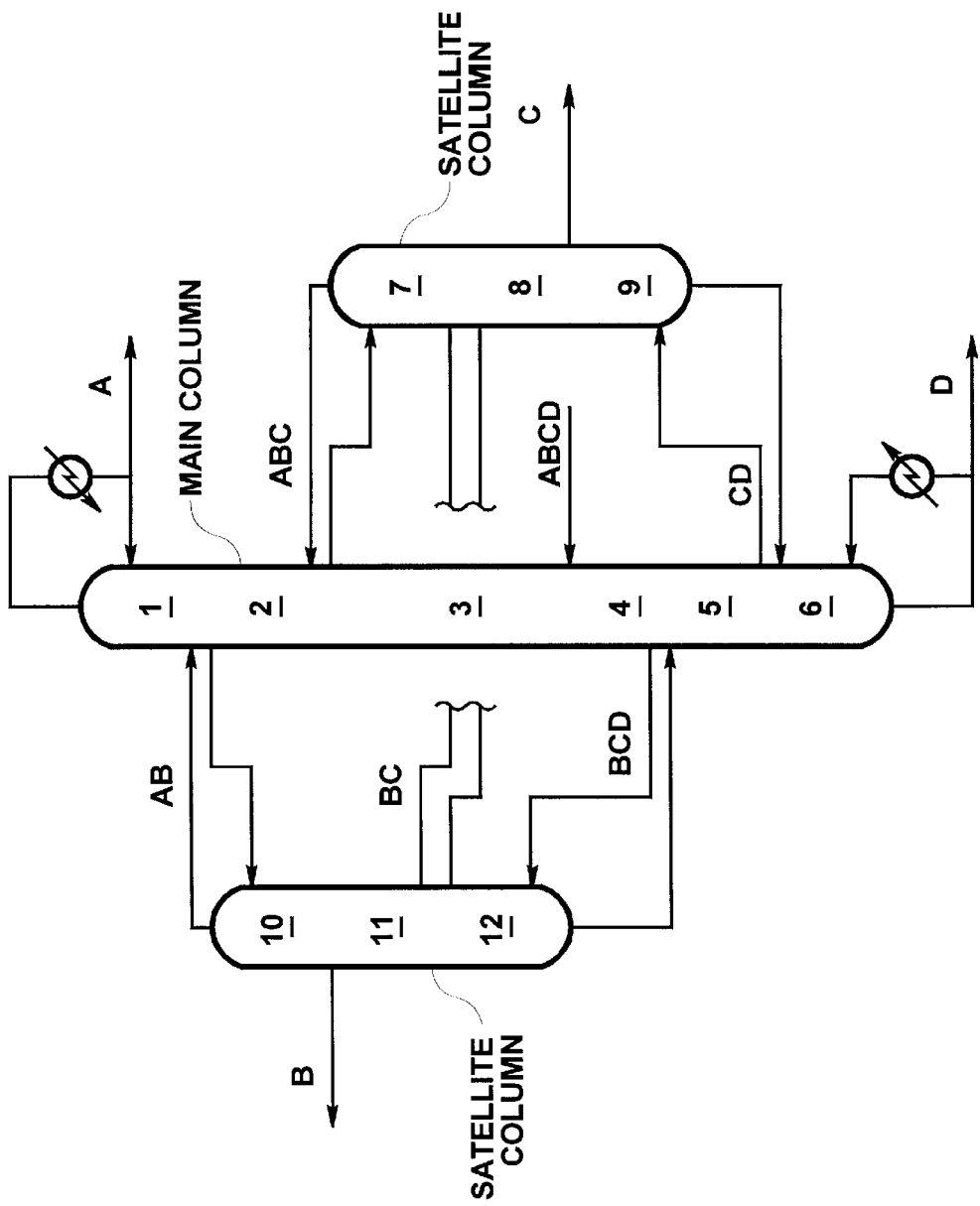
Figure 10:
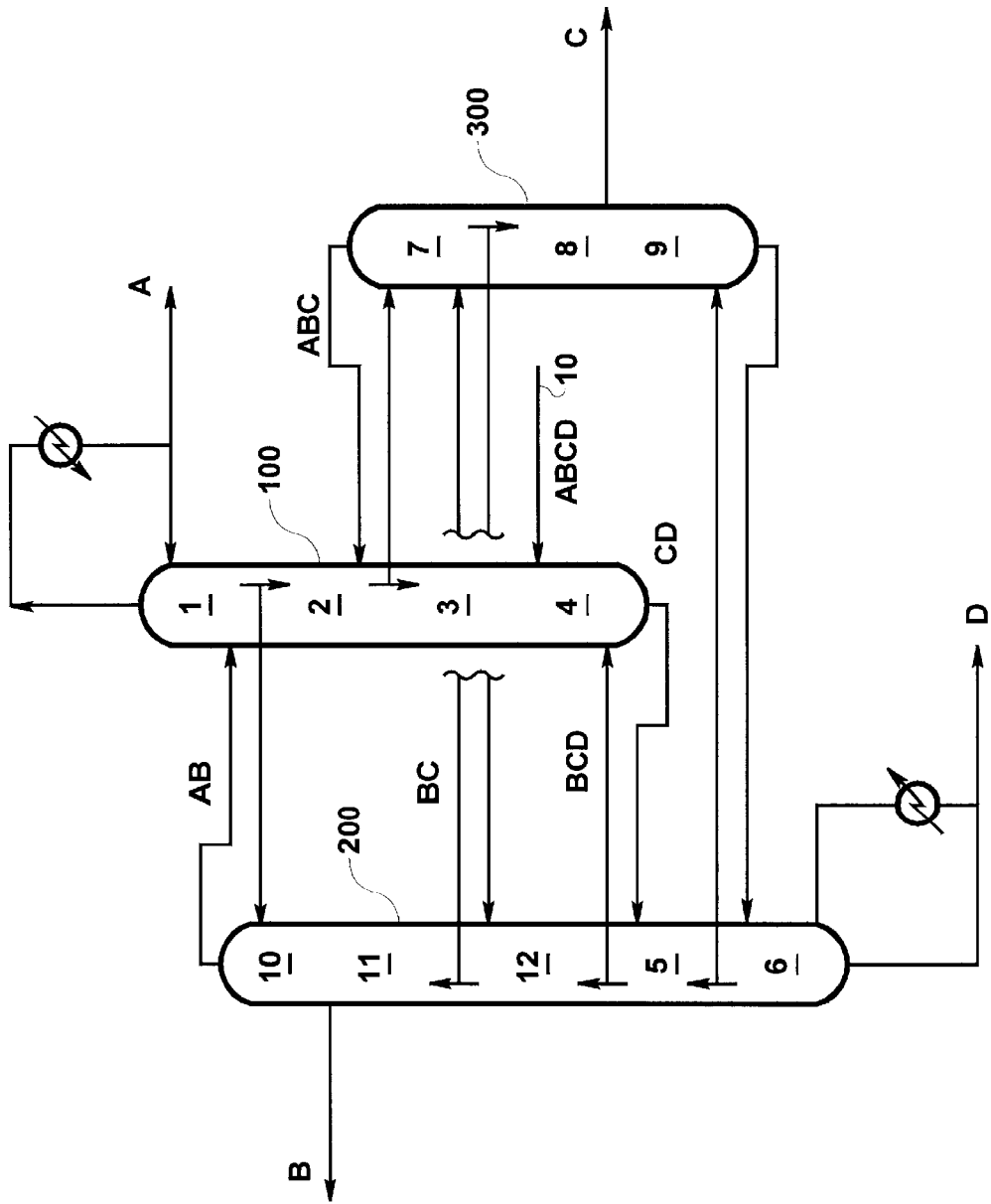

It is also possible to apply the current invention to the main column-satellite column arrangement shown in FIG. 4. In all, six thermodynamically equivalent flowsheets can be drawn using only one reboiler and one condenser. One of these embodiments is shown in FIG. 10. Once again the common distillation sections between the two schemes are identified in each of the figures. The feed stream 10 is fed to the main distillation column 100 that has the condenser for A-enriched vapor stream. The satellite column 200 produces the B-enriched product stream and has the reboiler for the D-enriched liquid stream at the bottom of the column. Thus main column 100 is the distillation column with the most volatile major constituent component at the top as in step (b) of the invention and the satellite distillation column 200 is the distillation column with the least volatile major constituent component at the bottom according to step (c) of the invention. Therefore, pressure of the satellite column 200 is greater than the pressure of the main distillation column 100, and pressure of the second satellite distillation column 300 is intermediate of the pressures of the other two distillation columns. Clearly, all the vapor streams flow from the higher pressure to the lower pressure and the operational challenges that exist for the transfer of the vapor streams in the process of FIG. 4 are absent.

It is self evident from the description of the invention that it can also be applied to feed mixtures containing more than four constituent components. As the number of components in a feed mixture would increase, the number of possible configurations that can be drawn using the current invention will also increase.

In all the flowsheets of FIGS. 1–10 some of the streams are designated alphabetical names. It shows the particular component in which that stream is enriched in, and does not necessarily mean absence of other components. Thus, a stream with letter A indicates a product stream enriched in component A and it could be pure product stream or a stream contaminated with significant quantities of other components. Similarly, a stream with designation AB means that the stream is enriched in components of A and B, and it either contains only components A and B or could contain other heavier components such as C.

In the flowsheets of FIGS. 5–10, control valves are not shown on the vapor transfer lines. Such valves can be easily used to control the flow of vapor from one distillation column to another.

It is possible to use an alternate source in lieu of the condenser to provide liquid reflux to the top of the distillation column with the most volatile major constituent component at top. Thus, in FIG. 5, condenser 215 may not be used and liquid reflux stream 72 could be obtained from an alternate source in the plant. Similarly, one might use an alternate source in lieu of the reboiler to provide vapor boilup to the bottom of the distillation column with the least volatile major constituent component at bottom. This implies that a reboiler such as the reboiler 125 in FIG. 5 may not be used and instead vapor boilup stream 92 is obtained from an alternate source in the plant. It is also worth noting that when a distillation scheme uses two or more two-way communications between distillation columns (as shown by distillation schemes in FIGS. 6–10) then some of these could easily be reduced to one-way communication only. This conversion to one-way communication may also be added by using additional reboilers or condensers. For example, the embodiment in FIG. 5 can also be obtained from the embodiment in FIG. 6 by converting the two-way communication between the top of the first distillation column 100 and the intermediate location of the second distillation column 200. In a one-way communication only either a liquid or a vapor stream is transferred between the two columns. Therefore, now only vapor stream 32 is sent from the first distillation column to the second distillation column. This conversion from two-way to one-way communication is aided by the use of an additional condenser 115. It is evident that several such schemes can be drawn by modifying many of the two-way communications in the processes of FIGS. 6–10. All such processes would also be considered to be part of the present invention.

The present invention is applicable to the separation of distillation of any suitable feed mixture containing three or more components. Some examples of feed streams which the present invention is applicable to include nitrogen/oxygen/argon mixtures, benzene/toluene/xylene mixtures, nitrogen/carbon monoxide/methane mixtures, any combination of three or more components from C1 to C5 alcohols, any combination of three or more components from C1 to C6 hydrocarbons, or $C_4$ isomers.

Among the prior art processes for ternary distillation, it is well known that the process in FIG. 1 requires the least total vapor flow to perform the required distillation. Since the vapor flows are created through the reboilers, the required vapor flow is a direct measure of the heat duty needed for the distillation. A lower vapor flow is attractive as it leads to lower heat duty and smaller diameter of the distillation columns. The same would be true for fully thermally coupled distillation schemes shown for a four-component feed mixture distillation in FIGS. 3–4. However, these distillation schemes have rarely been used in commercial applications. The primary reason is the operational challenges associated with the transfer of all the vapor streams between the distillation columns simultaneously in two opposite directions. This requires careful control of pressure profiles in each distillation column over the whole operating range. This stems from the fact that the pressure relationship between the two distillation columns is such that while the transfer of the first vapor stream requires that the pressure at a location of the first distillation column be higher than the pressure at a location of the second distillation column; the transfer of the second vapor stream requires reverse pressure difference between another two locations of the columns. The distillation schemes drawn according to the current invention do not have such constraints. All the vapor streams are transferred between two columns such that at each transfer point of each vapor stream, one column is always at a higher pressure than the other column. This allows much easier regulation of vapor flow from one column to the other column. The important point to note is that such an ease of operation is obtained while retaining the lower vapor flow rates of the prior art distillation schemes.

The process of the present invention has been discussed with respect to specific embodiments thereof. These embodiments should not be viewed as a limitation on the scope of the present invention. The scope of the present invention should be ascertained by the following claims.

What is claimed is:

1. A process for the separation of a feed stream containing three or more major constituent components of different relative volatilities into product streams that are enriched in one of the major constituent component by distillation in a distillation column system containing at least two distillation columns, wherein one column produces a vapor stream enriched in the most volatile major constituent component at its top and the other column produces a liquid stream enriched in the least volatile major constituent component at its bottom, comprising:

(a) feeding the feed stream containing three or more major constituent components to a distillation column of the distillation column system;

(b) providing reflux to the distillation column producing the vapor stream enriched in the most volatile major constituent component at its top by feeding a liquid stream enriched in the most volatile major constituent component to the top of such column;

(c) providing vapor boilup to the distillation column producing the liquid stream enriched in the least volatile major constituent component at its bottom by feeding a vapor stream enriched in the least volatile major constituent component to the bottom of such column;

(d) operating the distillation column producing the liquid stream enriched in the least volatile constituent component at the bottom such that the operating pressure at the location of this distillation column where a vapor stream is removed to be fed to another distillation column is greater than the operating pressure at the location of another distillation column where the vapor stream is fed;

(e) removing a first vapor stream from a location of the distillation column producing the liquid stream enriched in the least volatile major constituent component at its bottom and feeding the first vapor stream to a distillation column within the distillation column system;

(f) removing a second vapor stream from an intermediate location of the distillation column producing the liquid stream enriched in the least volatile major constituent component at its bottom and feeding the second vapor stream to a distillation column within the distillation column system;

(g) feeding a vapor stream that has been removed from a distillation column within the distillation column system to the distillation column producing the vapor stream enriched in the most volatile major constituent component stream at its top.

2. The process according to claim 1 wherein a portion of the most volatile major constituent component enriched vapor produced from the top of the distillation column producing a vapor stream enriched in the most volatile major constituent component at its top is at least partially condensed and at least a portion of the condensed stream provides the reflux stream in step (b).

3. The process according to claim 1 wherein a portion of the least volatile major constituent component enriched liquid exiting from the bottom of the distillation column producing a liquid stream enriched in the least volatile major constituent component at its bottom is at least partially vaporized and at least a portion of the vaporized stream provides the vapor boilup in step (c).

4. The process according to claim 1 wherein at least one of the vapor streams that are transferred in steps (e) and (f) is part of a two-way communication, wherein a liquid stream is also removed from a location of the distillation column where vapor is fed and this removed liquid stream is fed to the same location of the distillation column producing a liquid stream enriched in the least volatile major constituent component at its bottom from where the vapor stream was removed.

5. The process according to claim 4 wherein the feed stream contains three major constituent components of different relative volatilities; the distillation column system is comprised of the distillation column producing a vapor stream enriched in the most volatile major constituent component at its top and the distillation column producing a liquid stream enriched in the least volatile major constituent component at its bottom; the feed stream is fed to the distillation column producing a liquid stream enriched in the least volatile major constituent component at its bottom; the first vapor stream of step (e) is removed from the top of the distillation column producing a liquid stream enriched in the least volatile major constituent component at its bottom and fed to an intermediate location of the distillation column producing a vapor stream enriched in the most volatile major constituent component at its top; a portion of said first vapor stream is condensed and returned as reflux to the top of the distillation column producing a liquid stream enriched in the least volatile major constituent component at its bottom; the second vapor stream of step (f) is removed from the distillation column producing a liquid stream enriched in the least volatile major constituent component at its bottom at a location intermediate of the feed stream to and the bottom of the same distillation column and fed to the bottom of the distillation column producing a vapor stream enriched in the most volatile major constituent component at its top; liquid from the bottom of the distillation column producing a vapor stream enriched in the most volatile major constituent component at its top is fed to the distillation column producing a liquid stream enriched in the least volatile major constituent component at its bottom at the withdrawal location of said second vapor stream thereby establishing a two-way communication between these two distillation columns; a product stream enriched in the major constituent component of intermediate volatility is removed and recovered from an intermediate location of the distillation column producing a vapor stream enriched in the most volatile major constituent component at its top; a product stream enriched in the least volatile major constituent component is removed and recovered from the bottom of the distillation column producing a liquid stream enriched in the least volatile major constituent component at its bottom; and a product stream enriched in the most volatile major constituent component is removed and recovered from the top of the distillation column producing a vapor stream enriched in the most volatile major constituent component at its top.

6. The process according to claim 1 wherein the first and second vapor streams that are transferred in steps (e) and (f) are part of a two-way communication, wherein a liquid stream is also removed from a location of the distillation column where vapor is fed and this removed liquid stream is fed to a location from where the vapor stream was removed from the distillation column producing a liquid stream enriched in the least volatile major constituent component at its bottom.

7. The process according to claim 6 wherein the feed stream contains three major constituent components of different relative volatilities; the distillation column system is comprised of the distillation column producing a vapor stream enriched in the most volatile major constituent component at its top and the distillation column producing a liquid stream enriched in the least volatile major constituent component at its bottom; the feed stream is fed to the distillation column producing a liquid stream enriched in the least volatile major constituent component at its bottom; the first vapor stream of step (e) is removed from the top of the distillation column producing a liquid stream enriched in the least volatile major constituent component at its bottom and fed to an intermediate location of the distillation column producing a vapor stream enriched in the most volatile major constituent component at its top; liquid from the same intermediate location of the distillation column producing a vapor stream enriched in the most volatile major constituent component at its top is fed to the top of the distillation column producing a liquid stream enriched in the least volatile major constituent component at its bottom as reflux thereby establishing a two-way communication between these two distillation columns; the second vapor stream of step (f) is removed from a location intermediate of the feed stream to and the bottom of the distillation column producing a liquid stream enriched in the least volatile major constituent component at its bottom and fed to the bottom of the distillation column producing a vapor stream enriched in the most volatile major constituent component at its top; and liquid from the bottom of the distillation column producing a vapor stream enriched in the most volatile major constituent component at its top is fed to the distillation column producing a liquid stream enriched in the least volatile major constituent component at its bottom at the withdrawal location of said second vapor stream thereby establishing a two-way communication between these two distillation columns; a product stream enriched in the major constituent component of intermediate volatility is removed and recovered from an intermediate location of the distillation column producing a vapor stream enriched in the most volatile major constituent component at its top; a product stream enriched in the least volatile major constituent component is removed and recovered from the bottom of the distillation column producing a liquid stream enriched in the least volatile major constituent component at its bottom; and a product stream enriched in the most volatile major constituent component is removed and recovered from the top of the distillation column producing a vapor stream enriched in the most volatile major constituent component at its top.

8. The process according to claim 6 wherein the feed stream contains three major constituent components of different relative volatilities; the distillation column system is comprised of the distillation column producing a vapor stream enriched in the most volatile major constituent component at its top and the distillation column producing a liquid stream enriched in the least volatile major constituent component at its bottom; the feed stream is fed to the distillation column producing a vapor stream enriched in the most volatile major constituent component at its top; the first vapor stream of step (e) is removed from the top of the distillation column producing a liquid stream enriched in the least volatile major constituent component at its bottom and fed to an intermediate location of the distillation column producing a vapor stream enriched in the most volatile major constituent component at its top; liquid from the same intermediate location of the distillation column producing a vapor stream enriched in the most volatile major constituent component at its top is fed as reflux to the top of the distillation column producing a liquid stream enriched in the least volatile major constituent component at its bottom thereby establishing a two-way communication between these two distillation columns; the second vapor stream of step (f) is removed from an intermediate location of the distillation column producing a liquid stream enriched in the least volatile major constituent component at its bottom and fed to the bottom of the distillation column producing a vapor stream enriched in the most volatile major constituent component at its top; and liquid from the bottom on the distillation column producing a vapor stream enriched in the most volatile major constituent component at its top is fed to the withdrawal location of said second vapor stream thereby establishing a two-way communication between these two distillation columns; a product stream enriched in the major constituent component of intermediate volatility is removed and recovered from an intermediate location of the distillation column producing a liquid stream enriched in the least volatile major constituent component at its bottom; a product stream enriched in the least volatile major constituent component is removed and recovered from the bottom of the distillation column producing a liquid stream enriched in the least volatile major constituent component at its bottom; and a product stream enriched in the most volatile major constituent component is removed and recovered from the top of the distillation column producing a vapor stream enriched in the most volatile major constituent component at its top.

9. The process according to claim 1 wherein the vapor stream fed to the distillation column producing a vapor stream enriched in the most volatile major constituent component at its top in step (g) is chosen from the first or second vapor streams removed from distillation column producing a liquid stream enriched in the least volatile major constituent component at its bottom in steps (e) and (f).

* * * * *